United States Patent
Krause

(10) Patent No.: US 9,938,685 B2
(45) Date of Patent: Apr. 10, 2018

(54) BEAM AND PILE ANCHOR FOUNDATION FOR TOWERS

(71) Applicant: RUTE Foundation Systems, Inc., Portland, OR (US)

(72) Inventor: Douglas E. Krause, Portland, OR (US)

(73) Assignee: RUTE FOUNDATION SYSTEMS, INC., Portland, OR (US)

(*) Notice: Subject to any disclaimer, the term of this patent is extended or adjusted under 35 U.S.C. 154(b) by 0 days.

(21) Appl. No.: 15/210,653

(22) Filed: Jul. 14, 2016

(65) Prior Publication Data

US 2017/0030045 A1 Feb. 2, 2017

Related U.S. Application Data

(60) Provisional application No. 62/192,874, filed on Jul. 15, 2015, provisional application No. 62/297,724, filed on Feb. 19, 2016.

(51) Int. Cl.
*E04C 5/08* (2006.01)
*E02D 27/42* (2006.01)
(Continued)

(52) U.S. Cl.
CPC ............ *E02D 27/425* (2013.01); *E04B 1/215* (2013.01); *E04B 1/22* (2013.01); *E04B 1/24* (2013.01);
(Continued)

(58) Field of Classification Search
CPC ......... E02D 27/425; E04C 5/012; E04C 5/16; E04C 5/162; E04C 5/12; E04H 12/16;
(Continued)

(56) References Cited

U.S. PATENT DOCUMENTS 4,714,225 A * 12/1987 Skinner ............... H01Q 1/1242
248/523
5,586,417 A 12/1996 Henderson et al.
(Continued)

FOREIGN PATENT DOCUMENTS

| CA | 2844373 | 3/2016 |
|---|---|---|
| EP | 2256338 | 12/2015 |

(Continued)

OTHER PUBLICATIONS

International Search Report and Written Opinion, dated Oct. 24, 2016, International Patent Application No. PCT/US2016/042323 (14 pages).

*Primary Examiner* — Basil Katcheves
(74) *Attorney, Agent, or Firm* — Hamre, Schumann, Mueller & Larson, P.C.

(57) ABSTRACT

A foundation system for a tower, such as a wind turbine, includes a central hub assembly, a plurality of post-tensioned concrete beams, and an anchoring system associated with each beam. In use the foundation system is arranged so that the bottom surfaces of the concrete beams bear on soil and the anchoring is disposed within the soil. The beams can be inverted bulb-T beams having post-tensioning cables inserted there-through and cooperating with an oppositely disposed related beam. The central hub assembly can include a plurality of stacked disk elements or steel frame elements that are post-tensioned together to form a single hub structure.

7 Claims, 8 Drawing Sheets

(51) Int. Cl.
*E04B 1/24* (2006.01)
*E04B 1/22* (2006.01)
*E04B 1/21* (2006.01)
*E04H 12/16* (2006.01)

(52) U.S. Cl.
CPC ...... *E04H 12/16* (2013.01); *E04B 2001/2463* (2013.01)

(58) Field of Classification Search
CPC ... E04B 1/24; E04B 1/22; E04B 1/215; E04B 2001/2463
USPC ........................................................ 52/223.8
See application file for complete search history.

(56) References Cited

U.S. PATENT DOCUMENTS

| | | |
|---|---|---|
| 7,618,217 B2 | 11/2009 | Henderson |
| 8,359,798 B2 | 1/2013 | Armbrecht |
| 8,458,970 B2 | 6/2013 | Zavitz et al. |
| 8,661,752 B2 | 3/2014 | Phuly |
| 8,695,297 B2 * | 4/2014 | Knisel ................ F03D 13/22 52/223.2 |
| 8,833,004 B2 | 9/2014 | Prass |
| 9,096,985 B1 | 8/2015 | Phuly |
| 9,347,197 B2 | 5/2016 | Phuly |
| 9,518,402 B1 * | 12/2016 | Kundel, Sr. ......... E04H 12/2261 |
| 9,534,405 B1 * | 1/2017 | Phuly ...................... E04G 21/12 |
| 2007/0181767 A1 | 8/2007 | Wobben |
| 2010/0257794 A1 * | 10/2010 | Stark ........................ E02D 5/80 52/158 |
| 2012/0068039 A1 * | 3/2012 | Erich ...................... E02D 27/00 248/519 |
| 2012/0167499 A1 | 7/2012 | Knisel |
| 2013/0227898 A1 * | 9/2013 | Fairbairn ................ E02D 27/42 52/169.9 |
| 2013/0326970 A1 | 12/2013 | Prass |
| 2014/0033628 A1 | 2/2014 | Lockwood et al. |
| 2014/0115978 A1 * | 5/2014 | Fairbairn ................ E02D 27/42 52/126.1 |
| 2014/0237908 A1 | 8/2014 | Gupta |
| 2014/0260023 A1 | 9/2014 | Henderson |

FOREIGN PATENT DOCUMENTS

| | | |
|---|---|---|
| WO | 03-095748 | 11/2003 |
| WO | 2004101898 | 11/2004 |
| WO | 2011030199 | 3/2011 |

* cited by examiner

BEAM AND PILE ANCHOR FOUNDATION FOR TOWERS

FIELD

This technical disclosure relates to foundations for supporting columns and structures under heavy cyclical loads. More specifically, this technical disclosure relates to improved foundations for supporting wind turbines.

BACKGROUND

The conventional teaching in foundation and related support structures for onshore, large-scale wind turbines instructs on-site pouring of a large, thick, horizontal, heavily reinforced cast-concrete base and a vertical cast pedestal installed over the base. Such structures are referred to as a gravity foundation or a spread foundation.

The amount of cast concrete used in conventional wind turbine erection is staggering. In the United States alone, the wind industry buries in excess of 8 billion pounds of concrete each year as foundation structure (spread foundations) for approximately 4,000 wind turbines. This equates to roughly 2 million pounds of concrete poured for every wind turbine. And, once placed, this enormous mass of concrete cannot feasibly be removed, thus, forever remaining a part of the land, and removing about 300 acres of prime farm soil per year.

The conventional teaching of spread-footing, cast-in-place foundations also require a massive mobilization of resources to form, place steel rebar and pour concrete. This requires several months for construction and subsequent concrete curing prior to the tower erection work. This results in cost increases and inefficiencies in the construction and erection process. Further, the process of pouring such a massive concrete structure requires diligence to avoid improper curing and is replete with potential problems including the sophisticated planning and coordination required to pour large amounts of concrete per footing, in one continuous pour, without having cold joints. The volume of required concrete creates logistical problems as such a pour requires coordinating with multiple local batch plants the delivery plan of the large number of concrete trucks to the job site in a timely and organized manner. A further problem is the complexity of installing the rebar assembly into the foundation which requires assembling two layers of steel reinforcing meshes that are two to six feet apart across the full area of the foundation, while maintaining a strict geometric layout and specific spacing. This rebar assembly is made of extremely long and heavy rebar which requires the use of a crane in addition to multiple workers to install all the components of the assembly. The rebar often exceeds forty feet in length, thus requiring special oversized shipments that are very expensive and usually require special permits. The installation of the rebar is a labor intensive and time-consuming task requiring a large number of well-trained workers.

Another impediment of conventional foundations includes that the construction process consists of field-work which can easily be compromised by weather conditions and other site conditions, thus, weather adversely affects the foundation of such a large-scale pour of concrete.

Another problem is thermal cracking of concrete due to overheating of the concrete mass during curing. When concrete is cast in massive sections, the temperature can reach high levels and the risk of thermal cracking becomes very high. Thermal cracking compromises the structural integrity of foundations.

The current state of the art includes the teachings of the following references, which are hereby incorporated by reference for all purposes as if fully set out herein:
U.S. Pat. No. 8,661,752;
U.S. Pat. No. 8,833,004;
U.S. Pat. No. 8,458,970;
U.S. Pat. No. 5,586,417;
United States Published Application No. US 2012/0167499;
United States Published Application No. US 2014/0260023;
United States Published Application No. US 2014/0033628;
European Patent No. EP 2256338;
Published PCT patent application No. WO 2011/030199;
U.S. Pat. No. 7,618,217 B2 (Post-tension pile anchor foundation and method therefor); and
CA 2844373 A1 (Perimeter pile anchor foundation).

Despite the current state of the art, there remains a need for a viable foundation for wind turbines and similarly tall, narrow structures that reduces installation time, increases foundational stability, reduces defects during construction, minimizes erection time for the structure, and is otherwise better engineered for the specific site requirements.

SUMMARY

The described foundation, in its varied described embodiments, provides a cost-effective foundation that reduces the amount of construction material used in the construction of wind turbines. Further, the foundation made according to the methods described herein improves heat dissipation conditions during construction, thus eliminating the risk of thermal cracking due to heat of hydration.

Additionally, the foundations described herein use approximately 0.5 million pounds of concrete to create a foundation that meets the wind industry design and performance requirements and exceeds the performance of a conventional foundation requiring approximately 2 million pounds of poured-on-site concrete.

By incorporating high-strength beams, precisely located soil anchors, coupled with selectively improved soil conditions, the foundations described herein reduce the amount of concrete use in a wind-turbine foundation while simultaneously providing superior performance compared to conventional spread footings.

The foundations described herein use pre-cast components that are poured off-site under controlled conditions, which reduces waste in the amount of raw material used but also ensures high-performance, high-quality components that are not adversely affected by environmental conditions compared to field-pour concrete as taught in the prior art. These pre-cast components are delivered to a remote site to be assembled in the field at the desired location for a wind turbine. The use of the foundations and methods described herein, therefore, greatly reduces set-up time, waste, inefficiency while enabling rapid deployment of tower support structures for wind turbines, for example.

Other advantages and details of the foundations and methods are further described in the detailed description section, below.

DRAWINGS

DETAILED DESCRIPTION

Figure 1:
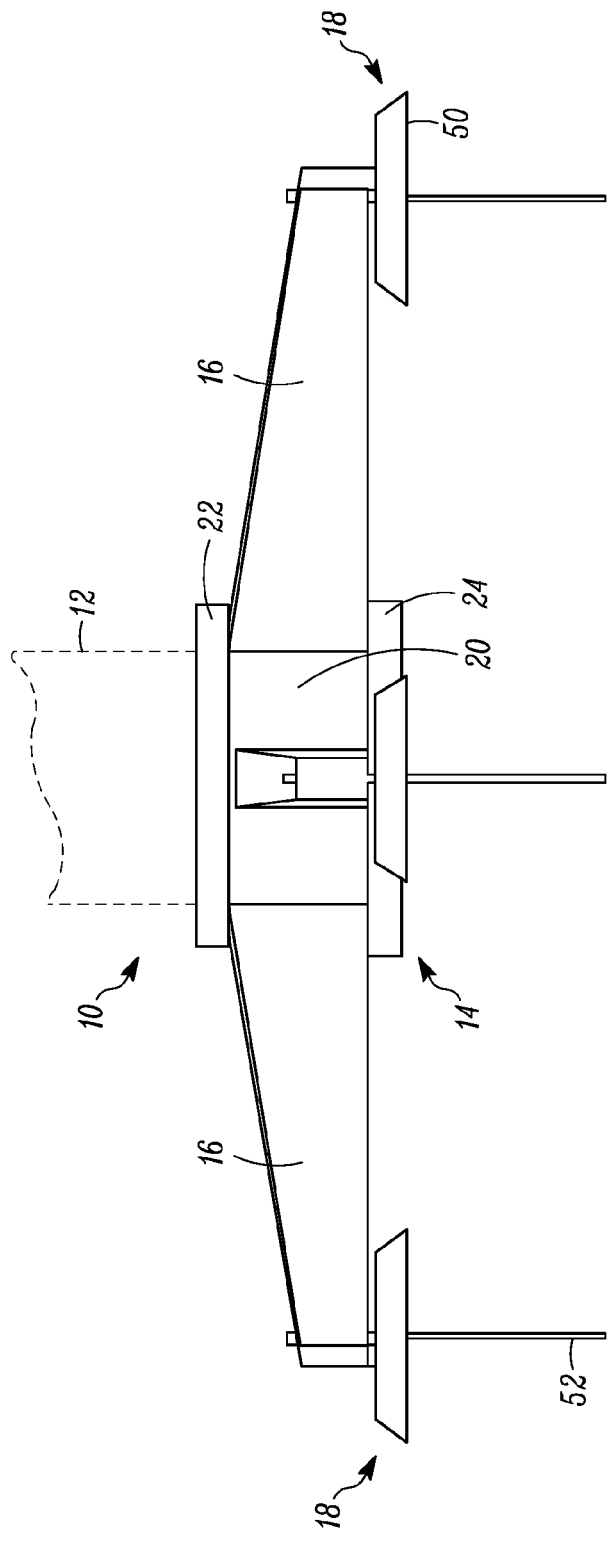
FIG. 1 is a front view of a foundation system according to one embodiment described herein.

Different embodiments will now be described with reference to the drawings and those skilled in the art will understand that alternative configurations and combinations of components may be substituted without subtracting from the claimed invention. Also, in some figures certain components may be omitted to more clearly illustrate the described embodiments.

In one embodiment, a foundation system for a tower, such as a wind turbine, is described. The foundation system is engineered for a particular installation, as such the forces imparted by the tower (such as a wind turbine) must be determined, and are provided to the foundation engineer by the tower (such as a wind turbine) manufacturer. Further, detailed soil analysis at the site, and more specifically at the beam bearing locations, either the soil bearing location under the T girder, or the terminus locations (where the distal end of each of the support beams will situate) and the soil condition at the center, corresponding to where the hub assembly will situate, is performed as part of the design phase of the foundation system.

The foundation system comprises a plurality, for example six or eight, concrete beams; a hub assembly made of steel or precast concrete segments, or a hub assembly of either concrete or steel materials which may also include a collar assembly as the outer component of the hub assembly; and an anchoring system disposed at the distal end of each beam.

In one embodiment, the hub assembly can include a collar, a hub in a center portion, and a cylindrical riser. The hub can be a steel circular truss frame that arranges vertically with a vertical sidewall in between each beam and can end in a space frame of tetrahedral arrangement, like a truss structure throughout the center hub. The cylindrical riser includes a plurality of vertical holes extending through from the top end to the bottom end. The holes are adapted to receive bolts that are used to attach the tower assembly to the hub assembly. In one embodiment there are 144 vertical through holes as predetermined by the turbine manufacturer. The hub can also include horizontal through holes adapted to receive anchoring bolts and tensioning cables from each of the beams at the proximal end of the beam.

The steel hub can also include at least one vertical sidewall with a plurality of horizontal through holes. The plurality of through-holes configures to enable the beam tensioning cables to pass there through so the cables can be adjustably tensioned at the installation site.

In an alternative embodiment, the hub can comprise a pre-cast concrete core assembly consisting of a plurality of disk-shaped core elements. This core, also termed a "footing core", can include or consist of a plurality of vertically stacked segments with match-cast horizontal joints. The core segments can be post-tensioned together to act as a single unit and can be further connected by the turbine pedestal anchorage rods. Cast-in-place concrete can connect the pre-cast core components (assembled together in situ) to the beams (described below).

Each beam includes a distal end and a proximal end. In one embodiment, the beams are substantially about 24-feet long and are conventional pre-stressed, post-tension concrete beams as might be used in highway, bridge, or similar construction. Each beam is engineered for the anticipated load, as previously discussed. Each beam includes at least one or, preferably, two flanges on both the top and bottom of the beam, and preferably a plurality of, post tensioning cables extending outside the proximal end.

Each beam is coupled to the anchoring system at the pile cap. And, in some embodiments the beam is coupled at several anchor locations along the beam. A plurality of bolts and/or flanges secures the distal beam end to the pile cap. The associated anchoring system arranges substantially perpendicular to the horizontally placed beam. The anchoring system is engineered for the load and soil conditions at the location where the distal end of the beam extends at the installation site.

One contemplated improved beam used in one embodiment is an inverted bulb-T concrete beam, also called outrigger beams. Bulb-T concrete beams are generally known in the art of bridge and highway span building. The PCEF Bulb-T beam was developed by the FHWA Pre-stressed Concrete Committee for Economical Fabrication. The bulb-T beam, when viewed from the end, appears similar to a conventional I-beam but the top flange extends wider than the bottom flange, thus giving it a "T" like shape. As used in the embodiments described herein, however, the bulb-T beam is inverted 180-degrees (when viewed from the end) so that the wider flange is on the bottom. In this configuration, a termed "inverted bulb-T" beam distributes the load of the tower over a greater surface area of the soil or ground, providing bearing resistance and bending transfer to the pre-cast core. These beams bear on the soil at substantially about the bearing pressures of standard spread footings. This embodiment means the load of the beams does not need to bear on the anchor in compression.

One embodiment described herein combines the duties of the inverted bulb-T beam, by bearing the flanges on the soil in compression and combining with additional compression bearing duty at the pile cap connection to the distal end of the beam.

Post tensioning cables in situ of the beams pass through the hub assembly. In one embodiment, opposing beams (at 180° when viewed from the top) can share common post-tensioning cables. The outrigger beams can be offset vertically by a small distance to allow the post-tensioning cables to pass through the hub without interference.

The anchoring system for each beam comprises at least one, and preferably three pile anchors engineered for the soil conditions. Traditional soil or rock pile anchors can be used based on the soil conditions, also referred to in the industry as piers, piles, or tension anchors. Examples of pile anchors include, but are not limited to, mechanical rock anchors, manta ray type anchors or post grouted anchors such as micropile anchors, and helical soil anchors.

In another contemplated embodiment, the primary anchor of the beams (for example the inverted bulb-T beam) comprises or consists of a basket/grillage concept, which means that the anchor is actually part of the structure, all ballast, and designed to mitigate cyclic strains on the soil while acting as a foundation element.

Optionally, and conditioned on the installation site conditions including soil conditions, the pile cap further includes a pad arranged at each distal end of each beam. The pad allows for soil bearing functions that replaces or possibly augments the anchor piles. For example, the soil overburden above the pad provides overturning stability for the foundation system. The pad can be a reinforced concrete foundation that integrates with the pile cap.

Optionally, the anchoring system can comprise a ballast anchor system that acts like a structure fixed to the associated beam. Overburden weight of the soil performs the entire duty of the anchoring required at the beam. Unlike typical soil anchors, no load demand on soil friction is in the design of this anchor ballast system. The anchor location is excavated, then the anchor ballast system is placed in the excavation and backfilled to specified (predetermined) soil conditions.

Referring to FIGS. 1-7, a first example embodiment of a foundation system 10 is illustrated. In use, the foundation system 10 supports a tower 12, such as a wind turbine, which is partially shown in dashed lines in FIG. 1. The foundation system 10 includes a central hub assembly 14, a plurality of beams 16, and an anchoring system 18 associated with each beam 16.

Figure 2:
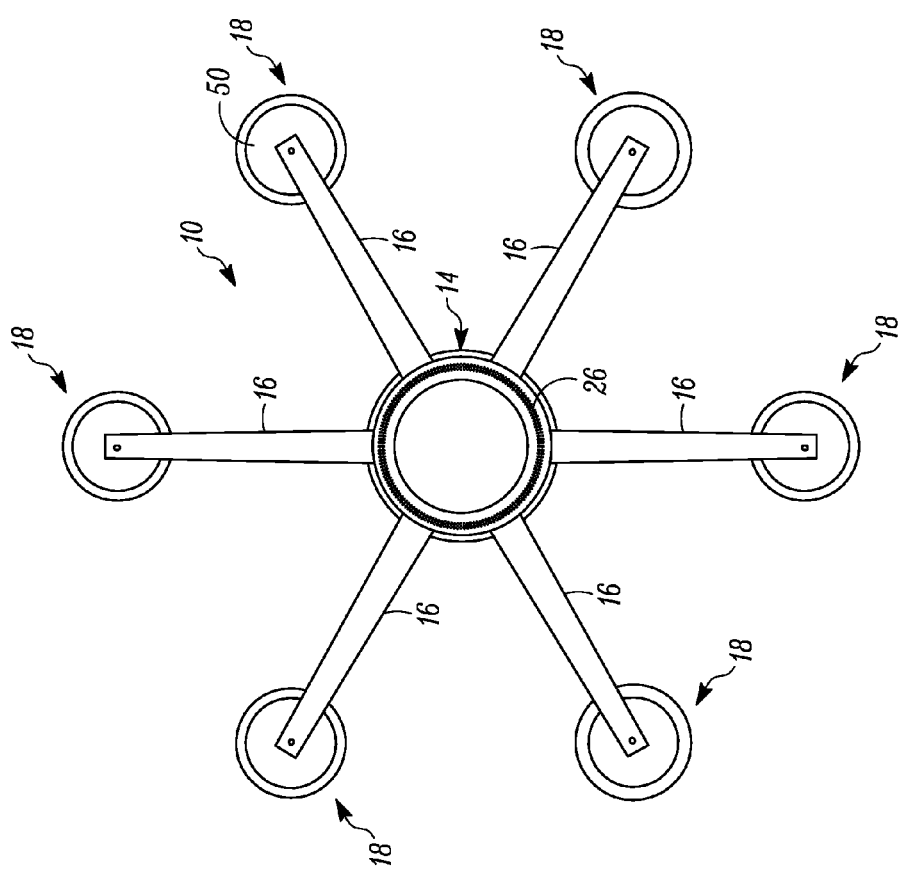
FIG. 2 is a top view of the foundation system of FIG. 1.
Figure 3:
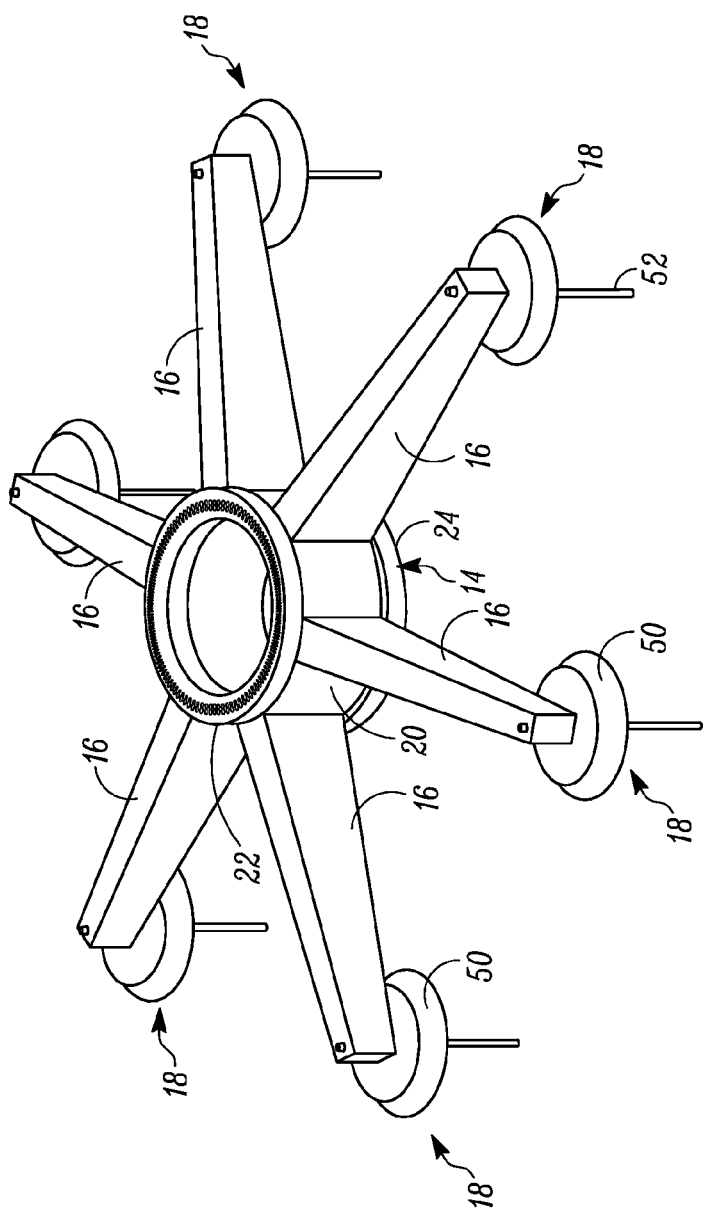
FIG. 3 is an offset frontal view of the foundation system of FIG. 1.
Figure 6:
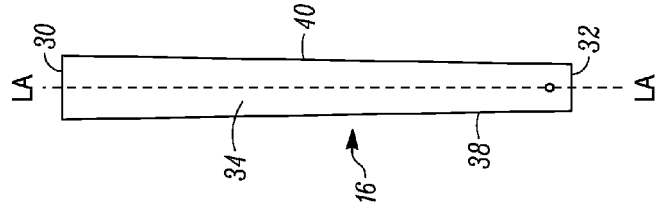
FIG. 6 is a top view of the support beam of FIG. 4.
Figure 7:
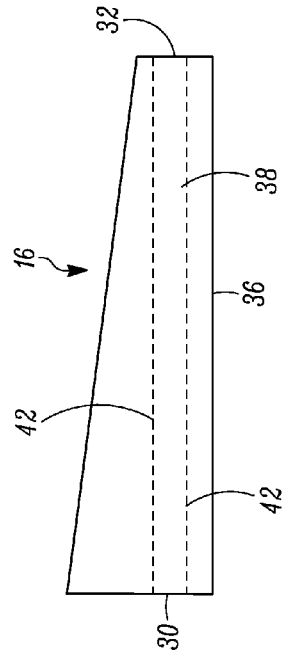
FIG. 7 is a side view of the support beam of FIG. 4.
Figure 4:
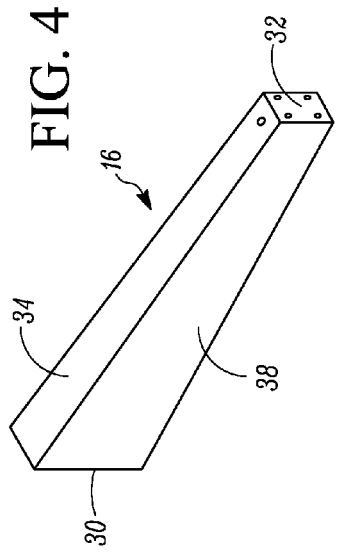
FIG. 4 is an offset frontal view of one support beam of the foundation system of FIG. 1.
Figure 5:
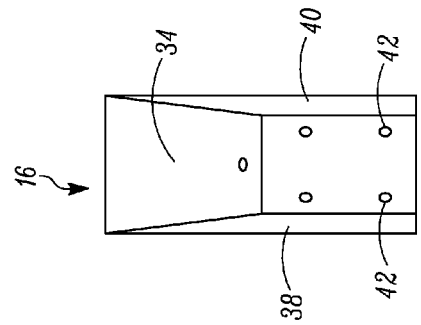
FIG. 5 is an end view of the support beam of FIG. 4.

The central hub assembly 14 can take any form suitable for performing the functions of the central hub assembly described herein. For example, as best seen in FIGS. 1 and 3, the central hub assembly 14 can include a central cylindrical hub 20 with an upper flange 22 at the top end of the hub 20 and a bottom flange 24 at the bottom end of the hub 20. As described above, the central hub assembly 14 can be formed of steel or precast concrete segments. A plurality of vertical holes 26 (visible in FIGS. 2 and 3) are provided that are adapted to receive bolts that are used to attach the tower 12 to the hub assembly 14. The hub 20 can also include horizontal through holes (not shown) adapted to receive anchoring bolts and tensioning cables from each of the beams 16 at proximal ends of the beams 16.

The beams 16 are post-tensioned concrete beams that project radially outward from the central hub assembly 14 and the hub 20 at equal circumferential intervals. FIGS. 1-3 illustrate six of the beams 16, however a larger, for example eight, or smaller, for example four, number of beams may be used. In one embodiment, there is an even number of the beams 16. Referring to FIGS. 1-7, each beam 16 has a proximal end 30 adjacent to the central hub assembly 14, a distal end 32 spaced from the proximal end 30, a longitudinal axis LA extending from the proximal end 30 to the distal end 32, an upper surface 34, a bottom surface 36, a first side surface 38 and a second side surface 40. Each beam 16 tapers in size from the proximal end 30 to the distal end 32. In particular, each beam tapers 16 continuously in height (i.e. measured between the upper surface 34 and the bottom surface 36) from the proximal end 30 to the distal end 32, with the bottom surface 36 remaining parallel to the ground and the upper surface 34 sloping downwardly. In addition, each beam tapers 16 continuously in width (i.e. measured between the first side surface 38 and the second side surface 40) from the proximal end 30 to the distal end 32.

Each of the beams 16 is post-tensioned by at least one, for example a plurality of, post tensioning cables 42 therein that extend from the proximal end 30 to the distal end 32, and that extend through the proximal end 30. As discussed above, the cables 42 are used to post-tension the respective beam 16. In embodiments where the beams 16 are arranged in offsetting pairs (i.e. pairs of the beams 16 are arranged diametrically opposite one another), such as is illustrated in FIGS. 2-3 and 8-10, the cables 42 can extend from the proximal end 30 of one of the offset pairs of beams 16, pass through the center hub assembly 14, and then extend into the opposite beam 16 of the offset pair.

As shown in FIGS. 2-3, the distal end 32 of each beam 16 is not directly connected to the distal end 32 of an adjacent one of the beams 16.

Referring to FIGS. 1-3, the anchoring system 18 associated with each beam 16 is connected to the beam 16 at the distal end 32 thereof. Each anchoring system 18 includes a pile cap 50 that is disposed below the bottom surface 36 of the beam 16. The pile cap 50 is a generally plate-like structure. In the example illustrated in FIGS. 1-3, each pile cap 50 is a generally circular disc or plate. Each pile cap 50 is connected to the respective beam 16 via at least one rod 52 which can be, for example, a pile anchor. Each rod 52 extends through the beam 16, through the pile cap 50 and into the soil beneath the pile cap 50 during use.

In use, the foundation system 10 of FIGS. 1-3 is arranged so that the bottom surfaces 36 of the concrete beams 16 bear on soil and the pile caps 50 are disposed within the soil, i.e. below grade.

FIGS. 8-14 illustrate another example embodiment of a foundation system 100. In use, the foundation system 100 supports a tower (not shown), such as a wind turbine. The foundation system 100 includes a central hub assembly 104, a plurality of beams 106, and an anchoring system 108 associated with each beam 106.

Figure 8:
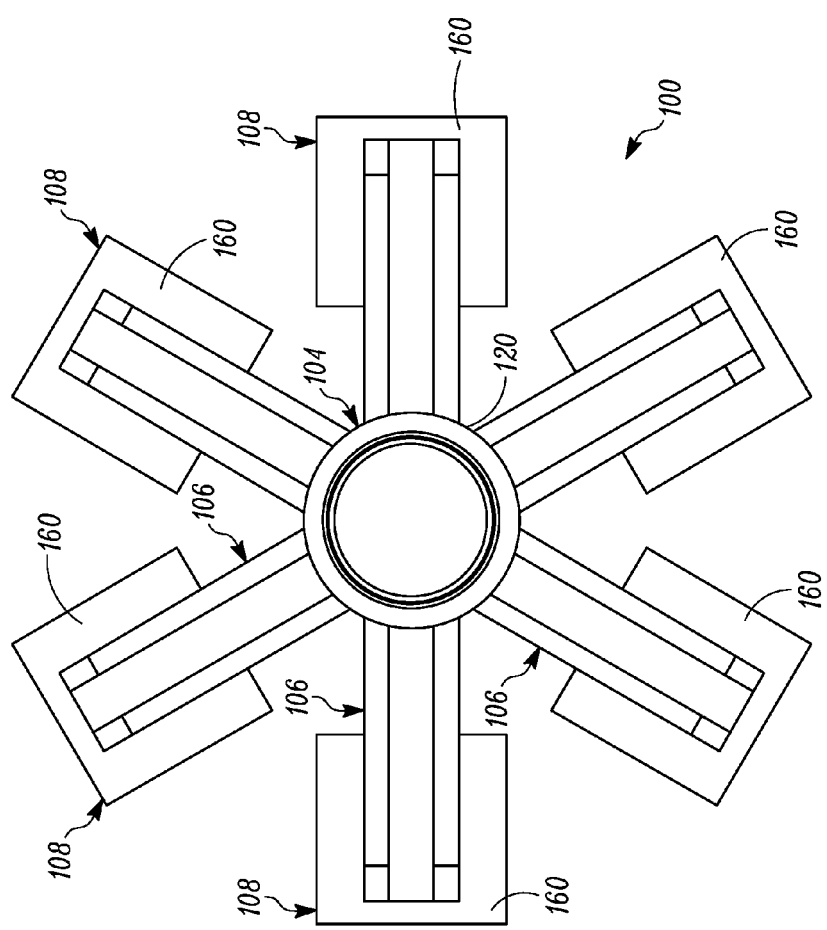
FIG. 8 is a top view of another embodiment of a foundation system described herein that uses a Bulb T beam and grillage anchor.
Figure 9:
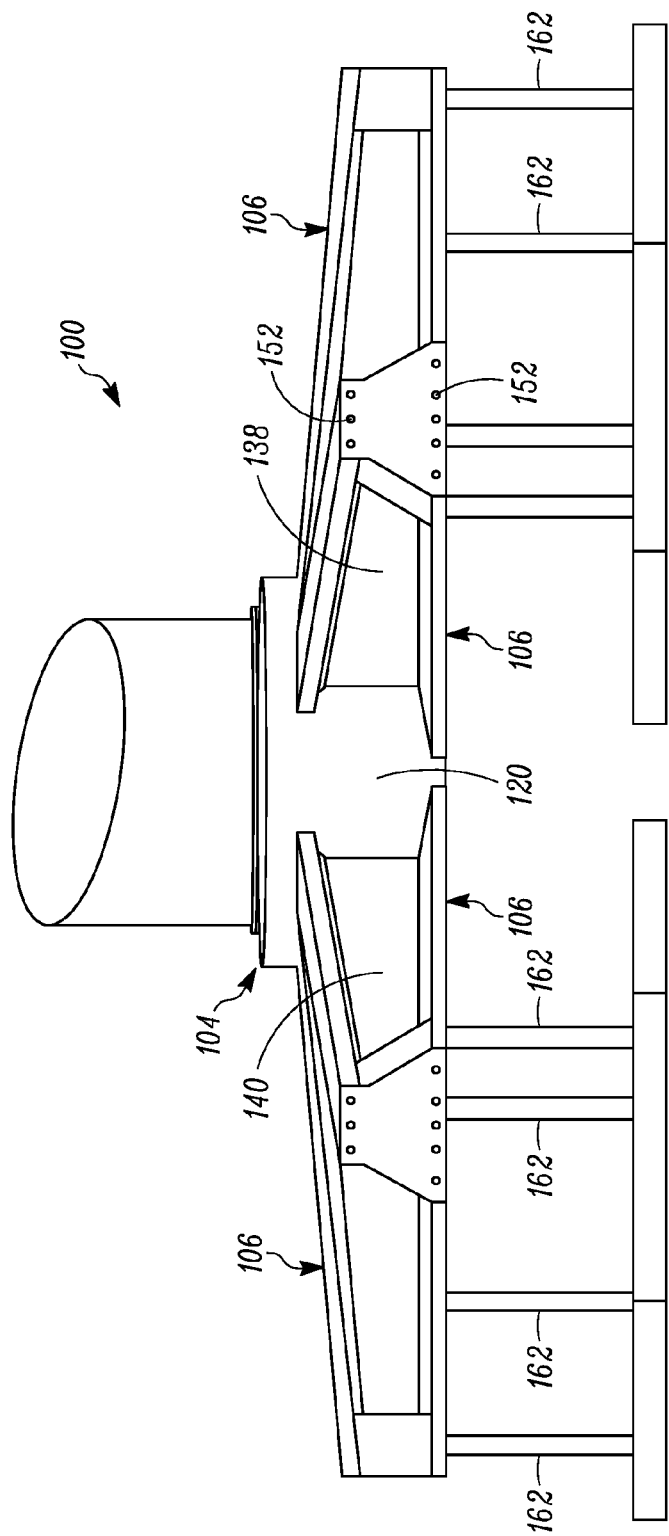
FIG. 9 is a front view of the foundation system of FIG. 8.
Figure 10:
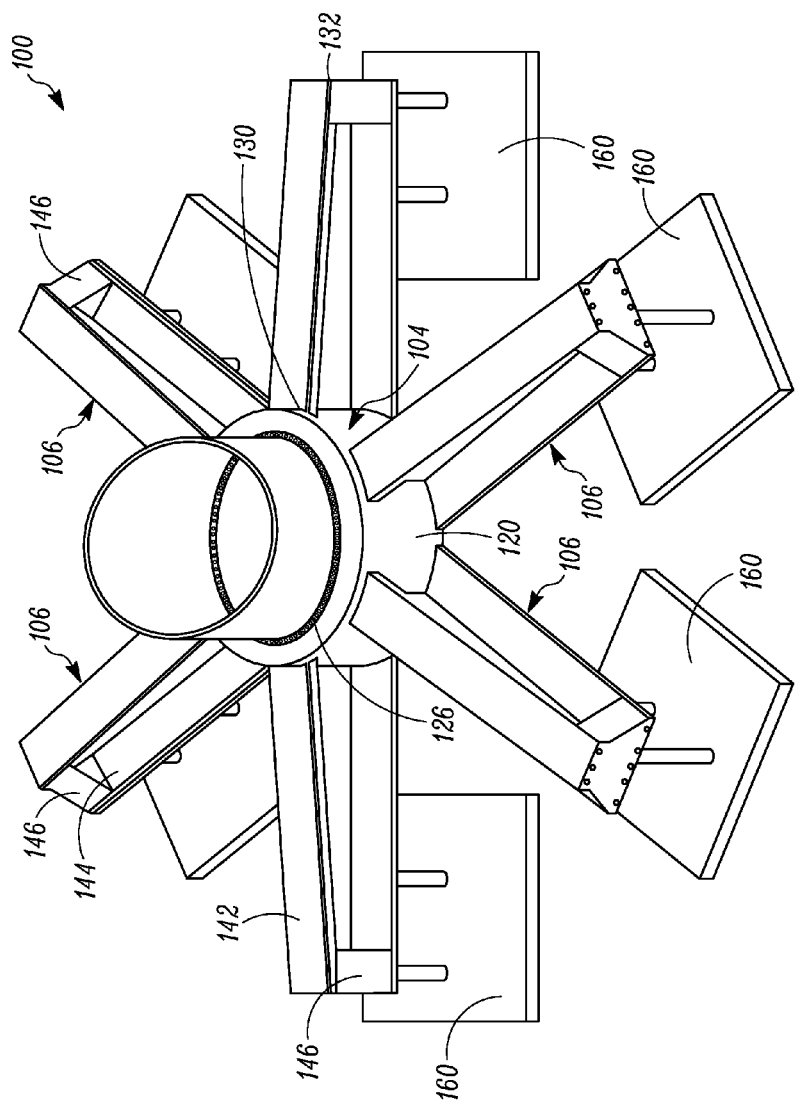
FIG. 10 is an offset frontal view of the foundation system of FIG. 8.
Figure 13:
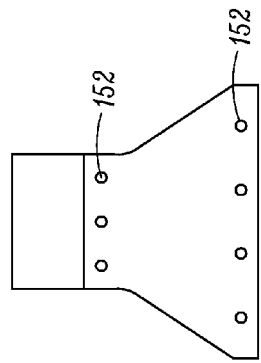
FIG. 13 is an end view of the support beam of FIG. 11.
Figure 14:
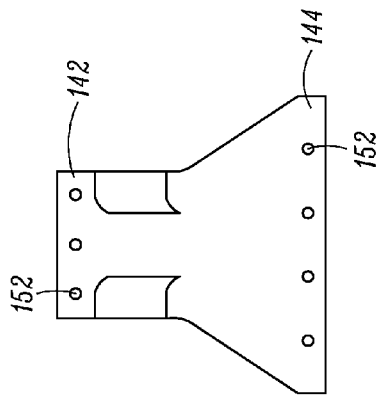
FIG. 14 is another end view of the support beam of FIG. 11.
Figure 11:
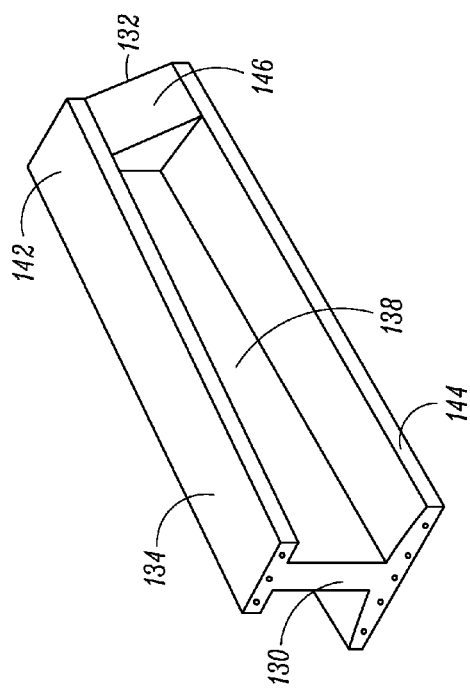
FIG. 11 is an offset frontal view of one support beam of the foundation system of FIG. 8.
Figure 12:
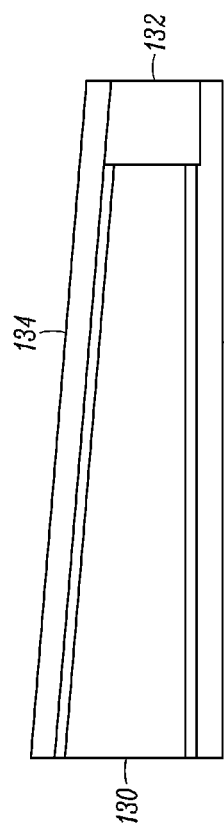
FIG. 12 is a side view of the support beam of FIG. 11.

The central hub assembly 104 can take any form suitable for performing the functions of the central hub assembly described herein. For example, as best seen in FIGS. 8-10, the central hub assembly 104 can include a central cylindrical hub 120. As described above, the central hub assembly 104 can be formed of steel or precast concrete segments. A plurality of vertical holes 126 (visible in FIG. 10) are provided that are adapted to receive bolts that are used to attach the tower to the hub assembly 104. The hub 120 can also include horizontal through holes (not shown) adapted to receive anchoring bolts and tensioning cables from each of the beams 106 at proximal ends of the beams 106.

The beams 106 are post-tensioned concrete beams that project radially outward from the central hub assembly 104 and the hub 120 at equal circumferential intervals. FIGS. 8-10 illustrate six of the beams 106, however a larger, for example eight, or smaller, for example four, number of beams may be used. In one embodiment, there is an even number of the beams 106. Referring to FIGS. 8-14, each beam 106 has a proximal end 130 adjacent to the central hub assembly 104, a distal end 132 spaced from the proximal end 130, a longitudinal axis LA extending from the proximal end 130 to the distal end 132, an upper surface 134, a bottom surface 136, a first side surface 138 and a second side surface 140. Each beam 106 tapers in size from the proximal end 130 to the distal end 132. In particular, each beam tapers 106 continuously in height (i.e. measured between the upper surface 134 and the bottom surface 136) from the proximal end 130 to the distal end 132, with the bottom surface 136 remaining parallel to the ground and the upper surface 134 sloping downwardly.

In this embodiment, each of the beams 106 comprises an inverted bulb-T concrete beam. Each inverted bulb-T concrete beam includes a top flange 142 that forms the upper surface 134 and a bottom flange 144 that forms the bottom surface 136. The bottom flange 144, which can be substantially horizontal, is wider than the top flange 142 which can also be substantially horizontal. The distal end 132 of each of the beams 106 can also include reinforcement 146. In one example as illustrated, the reinforcement 146 can take the form of a thickening of the material, such as concrete, used to form the beam at the distal end 132 between the top flange 142 and the bottom flange 144 so that the width of the thickening is greater than the width between the side surfaces 138, 140.

Each of the beams 106 is post-tensioned by at least one, for example a plurality of, post tensioning cables 152 therein that extend from the proximal end 130 to the distal end 132, and that extend through the proximal end 130. As discussed above, the cables 152 are used to post-tension the respective beam 106. In embodiments where the beams 106 are arranged in offsetting pairs (i.e. pairs of the beams 106 are arranged diametrically opposite one another), such as is illustrated in FIG. 8-10, the cables 152 can extend from the proximal end 130 of one of the offset pairs of beams 106, pass through the center hub assembly 104, and then extend into the opposite beam 106 of the offset pair.

As shown in FIGS. 8-10, the distal end 132 of each beam 106 is not directly connected to the distal end 132 of an adjacent one of the beams 106.

Referring to FIGS. 8-10, the anchoring system 108 associated with each beam 106 is connected to the beam 106 at the distal end 132 thereof. Each anchoring system 108 includes a pile cap 160 that is disposed below the bottom surface 136 of the beam 106. The pile cap 160 is a generally plate-like structure. In the example illustrated in FIGS. 8-10, each pile cap 160 is a generally rectangular plate however other shapes can be used. Each pile cap 160 is spaced from and below the distal end 132 of the respective inverted bulb-T concrete beam 106 so that a gap is formed between an upper surface of each plate and the bottom surface 136 of each beam 106. Each pile cap 160 is mechanically connected to the respective beam 106 via at least one, for example two, rod 162. The rod(s) 162 extend between the bottom surface 136 of each beam 106 and the upper surface of each plate in order to space the plates from the distal ends 132 of the beams 106.

In use, the foundation system 100 of FIGS. 8-10 is arranged so that the bottom surfaces 136 of the concrete beams 106 bear on soil and the pile caps 160 are disposed within the soil, i.e. below grade.

The embodiments described herein, in some soils and construction methods, provide a significant reduction of material excavation compared to conventional foundation systems for tower assemblies. For example, a trench style excavation of about 500 cubic yards represents about 25% of typical excavation material.

The assembly time is about 2 weeks and requires one 40-ton crane for one week. And, the foundations described herein enable full decommissioning with no loss of tillable soil post-decommissioning.

A method according to one embodiment described herein includes determining the soil conditions at predetermined particular locations on the turbine build site, such as: at the distal end of each of the support beams and at the center of the structure where the hub (and subsequently, the tower) rests. The soil conditions may differ or may be the same—in either event the foundation and anchoring device can be precisely tailored (engineered) at each of these locations. Then, based on the soil analysis at the location corresponding to the distal end of each of the beams, a foundation and anchor device is selected. Optionally, a soil pad may also be augmented to support the foundation system with a predetermined soil support constant.

The method can further include predetermining the load of the tower structure, including a margin of safety, and distributing that load over the beams. Pre-stressed concrete beams, with post-tensioning capability, are engineered based on this calculation.

A central hub is provided to couple the proximal end of each beam thereto and the post-tensioning cables are fed through the hub. A sleeve enables tensioning of the cables. For embodiments when the hub is made of a steel frame, this beam joint system is representative of ductile jointing in highway applications. In some applications the embodiments described herein can utilize a precast concrete, and in some of these applications a closure pour of concrete into the collar to form a rigid connection of the proximal beam ends.

In some applications the embodiments described herein can utilize a stack of precast discs that form a solid hub to form a rigid connection of the proximal beam ends.

The beams are assembled to the hub. The tensioning cables are tensioned to a predetermined tension. The correct tension can be determined by torque metering techniques, by hydraulic jack metering techniques, or by resonant frequency analysis whereby the tensioned cables are resonated and the frequency measured. A predetermined value for the frequency corresponding to the optimal tension is compared to a measured value. If the measured value is outside the range of acceptability, additional tightening or loosening of the cables is performed and re-measured. During subsequent preventative maintenance visits, this test can be repeated to determine proper adjustment of the beams.

Although this description is written referring to a wind turbine tower as the column being supported by the foundation, any tower or column can be used on the foundations described herein including, but not limited to, antennas, chimneys, stacks, towers, distillation columns, water towers, utility poles, electric power lines, bridges, buildings, or any other structure having a high height to base ratio.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A tower foundation system, comprising:
a central hub assembly;
a plurality of post-tensioned concrete beams projecting radially outward from the central hub assembly at equal circumferential intervals, each post-tensioned concrete beam having a proximal end adjacent to the central hub assembly, a distal end spaced from the proximal end, a longitudinal axis extending from the proximal end to the distal end, an upper surface, and an on grade bottom surface;
each post-tensioned concrete beam includes a plurality of post tensioning cables therein that extend through the proximal end and that post-tension the respective beam;
for each post-tensioned concrete beam the distal end thereof is not directly connected to the distal end of an adjacent one of the post-tensioned concrete beams;

a gap is provided between the on grade bottom surfaces of each adjacent pair of the post-tensioned concrete beams;

each post-tensioned concrete beam includes an anchoring system connected to the distal end thereof, each anchoring system includes a pile cap disposed below the on grade bottom surface and the pile caps are disposed within the soil; and each of the post-tensioned concrete beams comprises an inverted bulb-T concrete beam, each inverted bulb-T concrete beam includes: a substantially horizontal top flange that forms the upper surface and a substantially horizontal bottom flange that forms the on grade bottom surface, a vertical web that interconnects the top flange and the bottom flange, and the bottom flange is wider than the top flange, and the gap is provided between the bottom flanges of the adjacent pairs of the post-tensioned concrete beams.

2. The tower foundation system of claim 1, comprising an even number of the post-tensioned concrete beams.

3. The tower foundation system of claim 2, comprising six or eight of the post-tensioned concrete beams.

4. The tower foundation system of claim 2, wherein the post-tensioned concrete beams are arranged such that each post-tensioned concrete beam is disposed diametrically opposite another one of the post-tensioned concrete beams, and for each of the post-tensioned concrete beams the plurality of post tensioning cables thereof extend through the central hub assembly and into the post-tensioned concrete beam positioned diametrically opposite thereof.

5. The tower foundation system of claim 1, wherein for each inverted bulb-T concrete beam the plurality of post tensioning cables extend through the top flange and the bottom flange longitudinally from the proximal end to the distal end.

6. The tower foundation system of claim 1, wherein the central hub assembly comprises:
a steel frame or a plurality of precast concrete disk elements coupled by a post-tensioning system.

7. A foundation system for a wind turbine, the foundation system comprising:
a center hub assembly;
a plurality of pre-stressed inverted bulb-T concrete beams arranged in offsetting pairs, each pre-stressed inverted bulb-T concrete beam having a proximal end adjacent to the central hub assembly, a distal end spaced from the proximal end, and a longitudinal axis extending from the proximal end to the distal end;
each inverted bulb-T concrete beam includes a substantially horizontal top flange that forms an upper surface, a substantially horizontal on grade bottom flange that forms a bottom surface, a vertical web that interconnects the top flange and the on grade bottom flange, and the on grade bottom flange is wider than the top flange;
each inverted bulb-T concrete beam includes a first plurality of post-tensioning cables extending through the top flange longitudinally from the proximal end to the distal end and a second plurality of post-tensioning cables extending through the on grade bottom flange longitudinally from the proximal end to the distal end; and
a plurality of anchor devices disposed below grade and mechanically coupled to the distal ends of the inverted bulb-T concrete beams.

* * * * *